Figure 1:
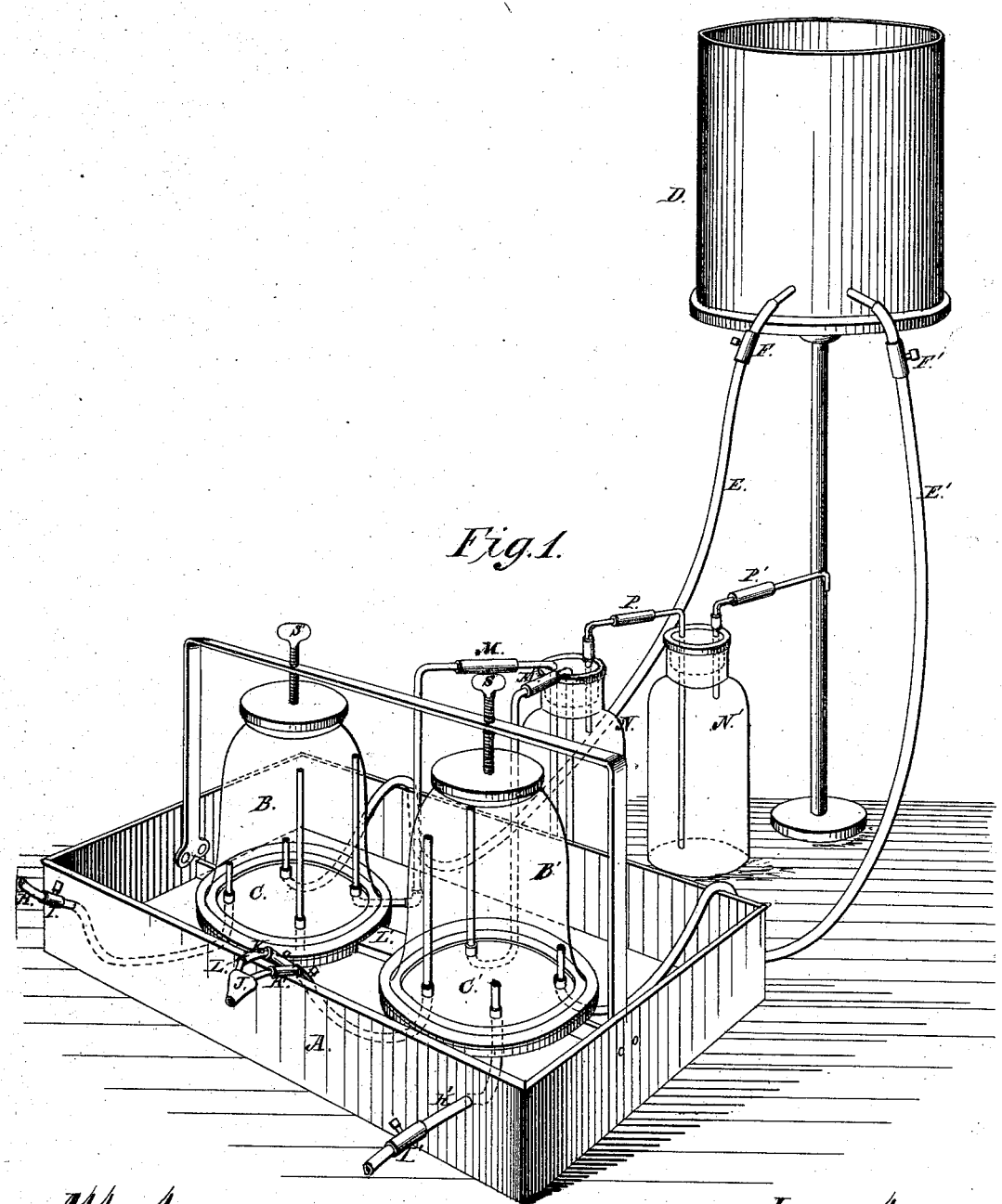

C. H. JOHNSON.
Apparatus for Applying Ozone for Purifying Oils, &c.
No. 154,758. Patented Sept. 8, 1874.

Attest
Francis L. Clark
Hugh Davis.

Inventor
Charles H. Johnson

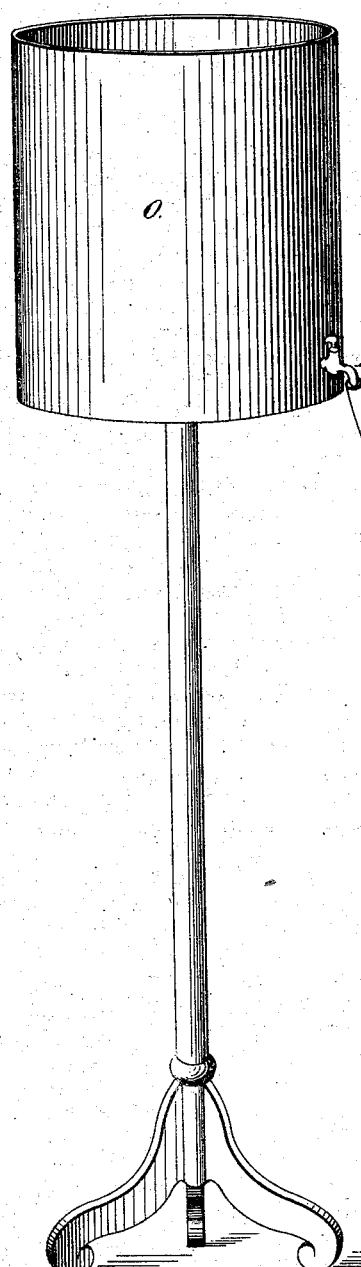

UNITED STATES PATENT OFFICE.

CHARLES H. JOHNSON, OF NEW BRIGHTON, PENNSYLVANIA.

IMPROVEMENT IN APPARATUS FOR APPLYING OZONE FOR PURIFYING OILS, &c.

Specification forming part of Letters Patent No. 154,758, dated September 8, 1874; application filed October 13, 1873.

*To all whom it may concern:*

Be it known that I, CHARLES H. JOHNSON, of New Brighton, in the county of Beaver and State of Pennsylvania, have invented a machine for applying ozone to certain valuable purposes, of which the following is a specification:

In my previous application for an invention for producing, purifying, and controlling ozone, I made a brief statement relative to the nature and importance of ozone, and named some of its uses.

My machine, to be described in the following specification, is designed to be used as an attachment to my apparatus for making ozone, referred to above, in order to secure the application of ozone to some highly-valuable ends, which could not be accomplished by the apparatus for making ozone alone.

This machine may be used as an attachment with any machine which generates ozone, and so controls it that it can be passed out through a tube.

My invention, used as an attachment, as already stated, is designed for purifying and ozonizing oils; also, for purifying liquors and imparting to them those peculiar properties which, under ordinary circumstances, they acquire only by age. This is accomplished by forcing ozone gas through a series of bottles or other vessels containing the oils or liquors. It is also designed for applying ozone to the deodorizing of all rancid animal oils, either liquid or concentrated, by condensing and concentrating the ozone, and bringing it into such intimate contact with them as to cause it to thoroughly permeate and purify the whole mass. It is also designed for applying ozone for bleaching purposes in such a manner as to secure the end much more rapidly and perfectly than could be done with my ozone-producer without this attachment. It is also designed for applying ozone to the preservation of slaughtered animals and dead bodies for transportation.

The accompanying drawing represents the machine.

A is a zinc-pan. B and B' are bell-shaped inverted jars, of glass or of wood, or metal lined with glass or porcelain. B and B' are alike in their form, relation, and use. Hence a description of B, with its support connecting-tubes, &c., will serve also as a description of B'. The jar B rests on an air-tight bottom, C. The air-tight bottom C rests on two small transverse bars underneath it running across the bottom of the pan A. The jar B is held down firmly to its place by means of the thumb-screw S. D is a reservoir filled with water, and having a position considerably elevated above the pan A. E is a rubber tube passing downward from the reservoir D under the air-tight bottom C, and through it upward into the jar B. F is a stop-cock on the tube E, near the reservoir D. H is a waste-pipe passing from the outside through the side of the pan A underneath the air-tight bottom C, and through it upward into the jar B. On the waste-pipe H is a stop-cock, I, outside of and near to the pan A. J is a tube connecting with the machine for producing ozone. This tube J is bifurcated, and one branch, K, passes under the air-tight bottom C, and through it upward within the jar B nearly to the top of the jar. On the tube K, outside of and near to the jar B, is a stop-cock, L. A tube, M, glass or metal, lined with glass or porcelain, passes from within the jar B, near the top, downward through the air-tight bottom C and outward from underneath it; then, curving upward, it passes to the top of the bottle N; thence downward through the air-tight cork of the bottle N to near the bottom of the bottle. P is a glass tube running from within the bottle N, starting near the top, and passing upward through the air-tight cork; then running to the top of the second bottle, N'; then passing downward through the air-tight cork nearly to the bottom of the bottle N'. P' is a tube of the same form as P, and connects N' with the next bottle of the series in the same manner that P connects N with N', as hereinbefore described.

The series of bottles can be extended at pleasure, connected in the manner already described. The last bottle of the series must have a short open tube or a small orifice through the air-tight cork in place of a second connecting-tube. The jar B', with its air-tight bottom C', tube E', with stop-cock F', the waste-pipe H', stop-cock I', tube K', with stop-cock L' and the tube M', are duplicates throughout of the jar B, air-tight bottom C, tube E, &c., hereinbefore fully described. The tubes K and M, also P P', &c., which come in contact with the ozone, should be of glass, or of wood or metal lined with glass or porcelain.

The jars B and B' are designed to alternate in operation. The force employed is hydraulic power. The reservoir D must have a position considerably elevated above the pan A with the jars B B'. The power may be increased to any extent desired by increasing the elevation of the reservoir D. The bottles N N', &c., must be filled nearly full of the oil or liquor to be ozonized or purified. The stop-cock F being opened the water passes from the reservoir D through the tube E, and is forced up into the jar B. While this is being done the stop-cocks I and L are kept closed. As the water is forced into the jar B the air is forced out of it through the tube M into and through the bottle N, and through the tube P into and through the bottle N', and so on through the series of bottles and out through the opening, which is provided for the purpose in the cork of the last bottle of the series. The stop-cock F must be closed before the water quite reaches the open ends of the tubes K and M, which are within the jar B, near the top. The stop-cock L must now be turned, letting in ozone from the ozone-producer through the connecting-tube J, and through K into the jar B. At the same time the stop-cock I must be opened, so as to let out the water from the jar B through the waste-pipe H. As the water rushes out of the jar B its place is taken by the ozone rushing in through the tube K. When the jar B is thus filled with ozone gas (only a little water being left in the bottom of the jar B) the stop-stocks I and L are closed and at the same time the stop-cock F is opened, letting the water into the jar B, and forcing the ozone gas through the tube M and through the series of bottles, with their contents, just as in the case of forcing the air through these bottles, as hereinbefore described.

As has been before stated, the jars B and B' are duplicates and alternate in their working. When the stop-cock F is open and I and L are closed, the stop-cock F' must be closed, and I' and L' must be opened, and vice versa. By this means a way is constantly open for the passage of ozone from the ozone-producer through the connecting-tube J, and through K or K' into B or B', and thus a continuous current of ozone is forced through the bottles N N', &c., with their contents, in the manner and by the means hereinbefore described.

In applying this machine to bleaching purposes, a reservoir is provided for receiving the material or fabric to be bleached. The ozone is forced into the reservoir through the tubes M and M', in the manner hereinbefore set forth. So, also, in using this machine for deodorizing all animal oils, either liquid or concentrated, a reservoir is provided for containing the material to be treated, and so constructed that the ozone forced into the reservoir through M and M', as hereinbefore set forth, is made to permeate and purify the whole mass.

To preserve a dead body, ozone is forced into an air-tight case containing the body through the tubes M and M'.

I claim—

The pan A, inverted jars B and B', tubes K and K', with waste-pipes H and H', and stop-cocks I and I', the reservoir D, tubes E and E', stop-cocks F and F', tubes M and M', bottles N and N', with tubes P and P', stop-cocks L and L', all combined substantially as and for the purposes set forth.

CHARLES H. JOHNSON.

Witnesses:
CHARLES FALK,
JOHN M'CARTY.